United States Patent Office 3,436,871
Patented Apr. 8, 1969

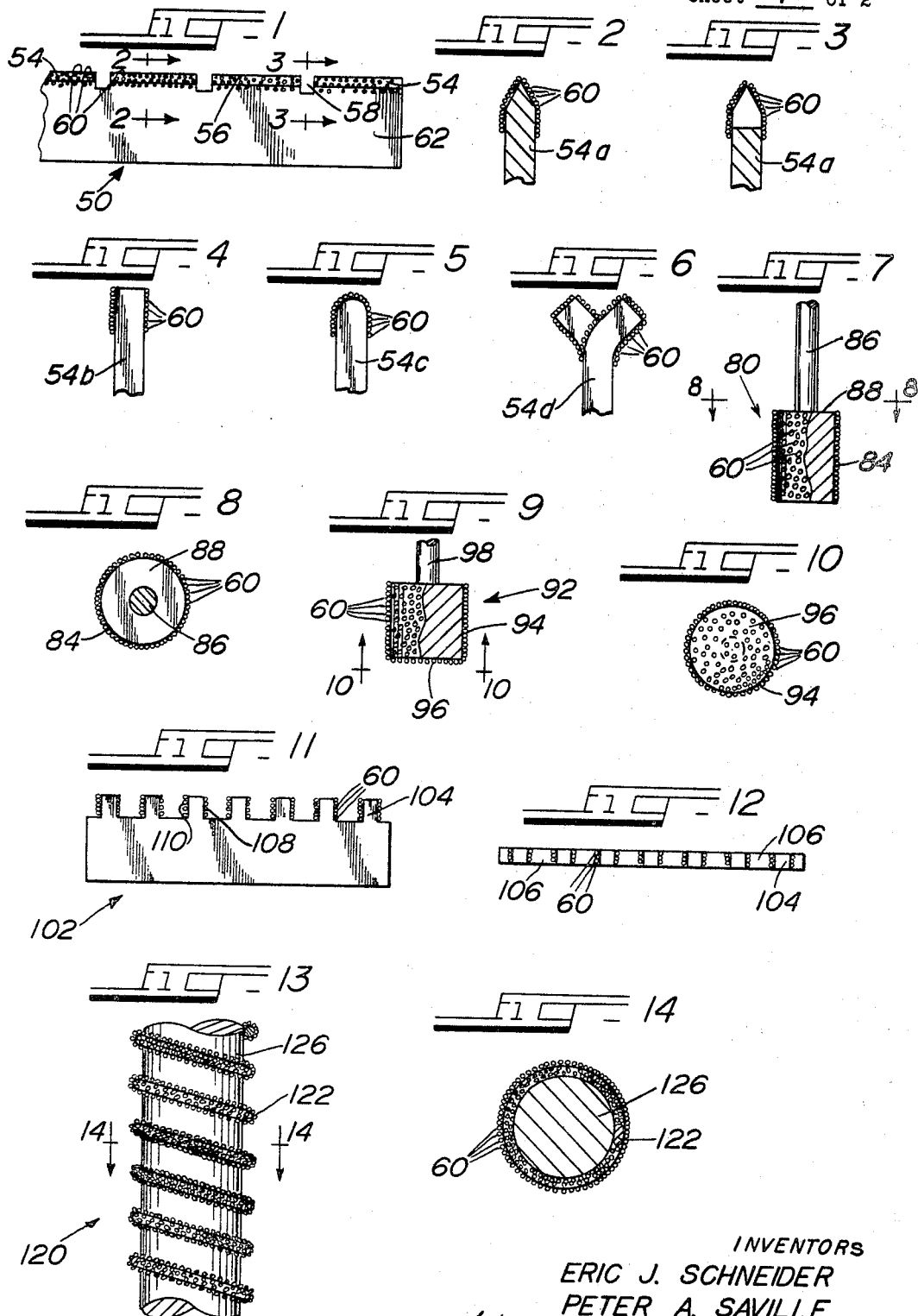

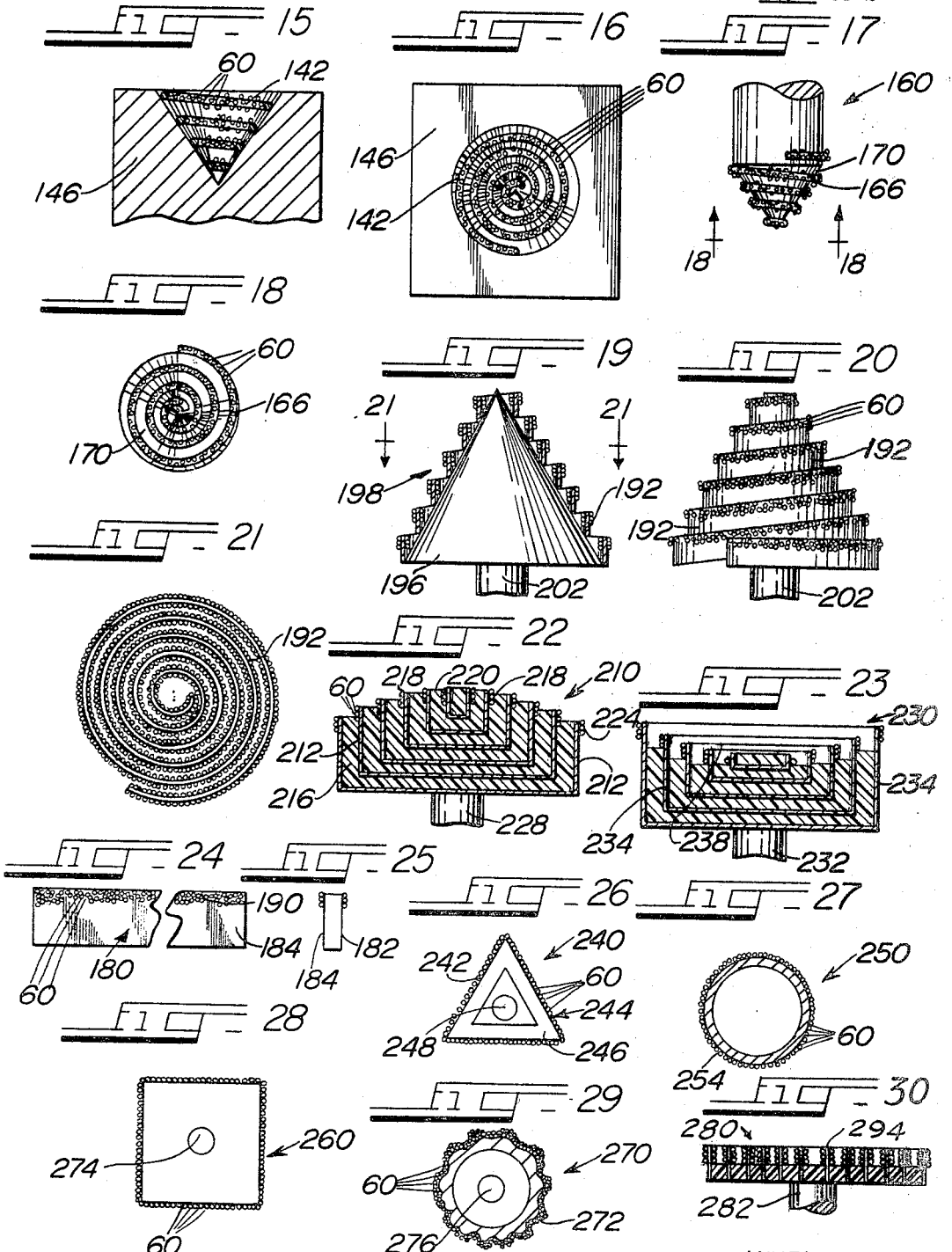

3,436,871
ABRASIVE CUTTING TOOLS
Eric J. Schneider, Chicago, and Peter A. Saville, Park Ridge, Ill., assignors to Hyprez Electrometallics Corporation, Morton Grove, Ill., a corporation of Illinois
Filed July 7, 1966, Ser. No. 563,584
Int. Cl. B24d 3/02, 7/02
U.S. Cl. 51—204         14 Claims

ABSTRACT OF THE DISCLOSURE

An abrasive tool including a band an edge portion of which defines a desired ultimate contour of a workpiece to be shaped, the band having abrasive particles bonded thereto on a side surface thereof adjacent a workpiece-presented edge portion of the band.

---

This invention relates to improvements in abrasive cutting tools such as saw blades, cutters, routers, planers, drills, grinders, shapers, and milling tools. More particularly, the invention is directed to such tools in which highly abrasive particles such as diamonds and silicon carbide are partially imbedded, adhesively bonded, electro-plated soldered, or otherwise firmly affixed to a surface of a supporting device or fixture to present cutting edges of the abrasive particles to a workpiece to be subjected to a cutting, grinding, or drilling operation.

Specifically, the invention is directed to improved abrasive cutting tools in which the diamond particles or a layer of diamond particles is carried on a surface of the supporting fixture, which surface extends generally parallel to the direction of advance or to the axis of movement of the tool against or into the workpiece. That is, in the abrasive cutting tools of the invention the abrasive layer or working zone extends generally transversely of that surface of the workpiece being cut or ground.

It is well-known in the prior art to utilize diamond particles and other highly abrasive particles as active elements of grinding and cutting tools in which the abrasive particles are secured to the tool or fixture to define a cutting zone. In such prior art tools, however, the functional portions of the abrasive coating have been disposed axially in alignment with or in a working plane axially in alignment with the direction of movement of the tool into the workpiece. The prior art structures have taken numerous and varied physical forms and many different manufacturing materials, fabrication techniques, and assembly procedures have been used. In spite of the long-time need, and notwithstanding the extensive research and development in the relevant art, no completely satisfactory tools in which abrasive grit such as diamond particles is carried on the surface have heretofore been produced. Each prior art physical embodiment has one or more undesirable or objectionable features which impair or limit its usefulness. For example, one important and particularly frustrating shortcoming of abrasive cutting tools which depend upon axially inline cutting surfaces is that as the material is cut away the powder formed is forced into the crevices between the diamonds. This process continues as the cutting tool is fed into the workpiece, and, finally, loading of the tool results. The loading causes overheating of and damage to the workpiece and often damages the tool itself. Moreover, abrasive particles bonded to the forward edge or on the workpiece-facing surface of the cutting tool will be effective only as long as the particles persist physically, on this edge or surface. The life of such tools is seriously limited. It is the aim of this invention to provide effective solutions to the problems mentioned above and to related problems to the end that improved abrasive cutting tools which avoid the shortcomings and the objectionable features of prior art structures may be realized.

The present invention, therefore, is directed to and has for one of its objects the provision of improved abrasive cutting and grinding tools in which the abrasive particles define an abrasive layer or surface which is not parallel to the base of or to the inwardly advancing workpiece-facing surface or leading surface of the tool itself.

It is a principal object of the invention to provide abrasive cutting tools in which the cutting zone extends laterally of the area of contact between the end face of the abrasive supporting surface of the tool and the workpiece.

It is a related object of the invention to provide an abrasive cutting tool in which the abrasive particles are carried on a side wall surface of an element advancing endwise into a workpiece.

It is another object of the invention to provide abrasive cutting tools in which the tendency for the abraded material to load the cutting tool is minimized, thus avoiding overheating of and damage to the workpiece and damage to the tool itself.

It is a further object of the invention to provide abrasive cutting tools in which the abradant surface is simply and conveniently formed to provide any preferred shape or contour.

Still another object of the invention is to provide in an abrasive cutting tool a ribbon-like band in which the abrasive particles are affixed to opposed side surfaces of the band in an area adjacent a longitudinally extending workpiece-penetrating edge of the band.

A related object of the invention is to provide an abrasive cutting tool of the band-saw blade type in which the abrasive particles are carried on lateral surfaces of the inwardly moving blade.

Another important object of the invention is to provide abrasive cutting tools in which the cutting element comprises an abrasive-carrying band or wire embedded in or supported on and forming a substantially integral component of a supporting device or fixture.

A related object of the invention is to provide abrasive cutting tools in which the physical and spatial disposition of the cutting elements of an abrasive-carrying band or wire supported in a cooperating fixture is readily adjustable or positionable to any preferred over-all contour to provide any required tool shape or grinding surface.

Yet another important object of the invention is to provide abrasive cutting tools in which the abradant element comprises a wire to which abrasive particles such as diamond grit are firmly bonded.

A related object of the invention is to provide abrasive cutting tools in which an abrasive carrying wire is wound upon, bonded to, or otherwise securely fastened to a supporting form.

Still another object of the invention is to provide abrasive cutting tools in which the abrasive-carrying elements define generally corrugated, undulating, or sinusoidal configurations as viewed edgewise.

Another object of the invention is to provide abrasive cutting tools in which the abradant element constitutes a planar or a non-planar convoluted coil of an abrasive carrying metal band or wire.

A related object of the invention is to provide abrasive cutting tools in which the abrasive particles are carried on the side surfaces of a plurality of internesting endless bands embedded in or fastened to a supporting fixture.

Yet another object of the invention is to provide abrasive cutting tools in which the abrasive-carrying band or wire is wound on, bonded, or otherwise affixed to a support which is a spheroidal, conical, triangular ellipsoid, or paraboloid conic section, or any other preferred configuration.

Other and further objects, advantages, and features of the invention will become apparent from a reading of the following specification taken in conjunction with the drawings in which:

FIGURE 1 is a fragmentary side elevational view of a segmental saw blade or band according to the invention;

FIGURE 2 is a cross sectional view taken on the line 2—2 of FIGURE 1;

FIGURE 3 is a cross sectional view taken on the line 3—3 of FIGURE 1;

FIGURE 4 is a view similar to that shown in FIGURE 2 but illustrating a modified cross-sectional configuration;

FIGURE 5 is a view similar to that shown in FIGURE 2 but illustrating still another cross-sectional configuration;

FIGURE 6 is a view similar to that shown in FIGURE 2 but illustrating a saw blade or band having set teeth;

FIGURE 7 is a plan view, partly in vertical section, illustrating a router or surface planer according to the invention;

FIGURE 8 is a cross sectional view taken on the line 8—8 of FIGURE 7;

FIGURE 9 is a plan view, partly in vertical section, illustrating an internal grinder or milling tool according to the invention;

FIGURE 10 is an end view taken on the line 10—10 of FIGURE 9;

FIGURE 11 is a fragmentary side elevational view of a saw blade or band according to the invention;

FIGURE 12 is a top plan view of the band of FIGURE 11;

FIGURE 13 is a fragmentary front elevational view of a routing tool according to the invention and illustrating an abrasive-carrying wire wound on a supporting rod;

FIGURE 14 is a cross sectional view taken on the line 14—14 of FIGURE 13;

FIGURE 15 is a view, partly in section, illustrating a shaping tool according to the invention and comprising an abrasive-carrying tube or wire fastened onto a conical grinding surface;

FIGURE 16 is a top plan view of the tool of FIGURE 15;

FIGURE 17 is a fragmentary front elevational view of a tapered spiral reamer or countersink comprising an abrasive-carrying wire bonded to a supporting rod having a tapered end portion;

FIGURE 18 is an end view of the tool of FIGURE 17 as viewed on the line 18—18 of FIGURE 17;

FIGURE 19 is a front elevational view, partly in section, of a grinding tool according to the invention and illustrating an edge-coated abrasive band helically wound on and bonded to a supporting fixture;

FIGURE 20 is a front elevational view of the tool of FIGURE 19;

FIGURE 21 is a top plan view of the tool of FIGURE 19 taken on the line 21—21;

FIGURE 22 depicts a vertical cross sectional view of a convex grinding, forming, or shaping tool or countersink according to the invention and illustrating concentric abrasive carrying bands or metallic strips, the abrasive being bonded to peripheral side portions of the bands and the bands being embedded and firmly held in a supporting fixture;

FIGURE 23 is a vertical cross sectional view of a tool similar to that illustrated in FIGURE 22 but shaped to present a concave working surface;

FIGURE 24 is a fragmentary elevational view of a blade or band according to the invention and coated with abrasive grit on the sides only;

FIGURE 25 is an end view of the blade of FIGURE 24;

FIGURE 26 is a top plan view of a grinding tool according to the invention;

FIGURE 27 is a fragmentary bottom end view of a hole cutter or circle cutter, according to the invention;

FIGURE 28 is an end view of a polygon-walled grinding tool according to the invention; and FIGURE 29 is a bottom end view of a groove cutter or cup wheel, according to the invention, and illustrating a corrugated, undulating, or sinusoidal cutting band; and FIGURE 30 is a vertical cross-sectional view of a tool similar to that illustrated in FIGURE 22 but shaped to present a planar working surface.

The aims and objects of the invention are accomplished by providing abrasive cutting tools comprising bands, ribbons, blocks, strips, wires, rods, rings, and other mechanical elements of any preferred configurations in which diamond grit or other highly abrasive particles are affixed to the supporting element, fixture, or device to define a cutting zone extending generally laterally of the direction of axial or penetrating movement of the tool into the workpiece. The particular method of bonding or adhering the grit to the supporting substrate does not form an element of the subject invention, and the bonding techniques well known in the art may be utilized. Suitable techniques the specific utility of which will depend upon the particular use to which the tool is to be put include resinoid bonding and metal bonding, the latter having been found to be highly suitable technique particularly where diamond particles are employed as the abrasive medium. The metal bond may be applied either electrolytically or in any other preferred manner. Those skilled in the art will recognize that other abrasive particles including such compositions as silicon carbide may be used with either metal or resin bonding. In some of the preferred structures of the present invention a grit-supporting metal substrate, for example, a metallic band, itself constitutes the tooling device or fixture. In other preferred embodiments of the tools of the invention, a metal band or wire to which the abrasive particles are bonded is itself wound upon or fastened in a supporting metal or a plastic fixture.

For purposes of illustrative disclosure and not by way of limitation, the invention is shown embodied in various types of cutting tools in each of which the significant and advantageous principle of the invention is invoked. That principle, as described above, involves the use of abrasive particles or a layer of abrasive particles on what may be referred to as the side surface or surfaces of a tube, band, wire, rod, plate, block, ring, or any other preferred structural element or shape so that the diamonds or other abrasive particles are disposed in a plane which is nonparallel to the workpiece surface to be machined or cut.

Referring now to the drawings and particularly to FIGURES 1 through 6, for purposes of illustrative disclosure, the abrasive cutting tool of the invention is shown embodied as a saw blade 50 for a band saw or hack saw. The blade 50 comprises a relatively thin band or ribbon 52 formed with individual teeth or segments 54 linearly spaced along the working workpiece-abutting edge 56 of the saw blade, the teeth 54 being separated from each other by gullets or slots 58. The abrasive particles 60, which may be any suitable material such as diamond grit or silicon carbide, but which is preferably diamond grit, is, in the preferred embodiment of the invention, applied only to the side surfaces 62 of the band 52 and in that region of the band which defines the cutting zone. The cross sectional configuration of the saw teeth 54 of the blade of FIGURE 1 may take any preferred form. One preferred embodiment 54a is illustrated in FIGURES 2 and 3 and other suitable shapes 54b, 54c, and 54d are shown respectively in FIGURES 4, 5 and 6. As indicated schematically, the teeth 54d of FIGURE 6 are "set."

A router or surface planer 80 is shown in FIGURES 7 and 8. In the particular form of the invention illustrated, the tool is tubular as viewed endwise, and the abrasive particles 60 are bonded to the outer surface of the cylindrical wall 84. A shaft or shank 86 extends coaxially with the cylindrical wall 84 and is fastened thereto by means of a transversely extending web or flange 88 to provide an integral structure. A grinder or milling tool 92 embodying the principles and teachings of the present invention is illustrated in FIGURES 9 and 10. As shown the tool 92 is generally cylindrical in form and includes both a side wall 94 and a base wall 96, with abrasive particles 60 firmly bonded thereto. A shaft or shank 98 is fastened to the tool in the usual manner.

A second embodiment of a saw blade 102 is shown in FIGURES 11 and 12. As indicated schematically, the linearly spaced teeth 104 are separated by gullets or slots 106, and in the particularly preferred form of the invention illustrated, abrasive particles such as diamond bort 60 or the like are applied to the forward 108 and rear 110 surfaces of the teeth 104. "Forward" is here used in the sense of representing the direction in which the saw blade or band 102 travels, revolves, or slides, as the teeth 104 themselves penetrate into a workpiece (not shown).

A modified form of the invention is illustrated in FIGURES 13 and 14 in which the abrasive tool 120 comprises a wire 122 which is coated with firmly bonded abrasive particles 60, the wire 122 being wound in spring-like fashion and being fastened onto a supporting fixture 126. In the particular example of the fixture illustrated, the fixture is rod-like and generally cylindrical in shape. It is readily apparent, however, that a fixture having any preferred peripheral contour may be used, suitable cross sectional shapes including triangular rods, square rods or bars, as illustrated schematically in FIGURES 26 and 28, as well as ellipsoid shapes, sinusoidal contours (FIGURE 29), and regular and irregular polygons. The fixture to which the abrasive coated wire 122 is applied may conveniently include a shaft or shank as previously described. With reference to the innumerable cross sectional shapes which may be used for fixtures in the practice of the present invention, it is of course obvious that, consistent with the teachings of the invention, the abrasive particles may be applied to and bonded directly to the side wall surfaces of the fixture without the use of the wire means.

The composition or material of the fixture or substrate to which the abrasive coated wire is applied or bonded is not critical and metal or plastic holders of any desired shape may be used. Moreover, any suitable means may be employed to attach or fix the wire to the fixture. Such attachment means includes but is not limited to soft solder, silver solder, adhesives such as epoxy glues or resins, mechanical means such as staples, rivets, and the like.

Referring now to FIGURES 15 through 18, the invention is illustrated as an abrasive-coated wire 142 or an abrasive-coated tube which is soldered, glued, or otherwise fastened to a cooperating fixture to provide either a cavity tool or a projection tool. As illustrated in FIGURES 15 and 16 the fixture 146, which may be of plastic, metal or any other preferred structural material, defines a cone-shaped recess or surface 148 on to the walls 152 of which is fastened an extended helical spring-like abrasive-coated wire 142.

The tool 160 illustrated in FIGURES 17 and 18 comprises a reamer or countersink in which an abrasive coated wire 166 is helically wound to traverse, spring-like, a tapering wall surface 170.

Referring now to FIGURES 19 through 25, and particularly to FIGURES 24 and 25, another preferred embodiment of the invention contemplates the use of a flexible blade or band 180 which is coated with abrasive particles 60 on its side walls 184a and 184b only, along a longitudinal edge portion 190 of the band 180. In the light of the teachings of the present invention, it will be appreciated that the uses of such a flexible band or ribbon 180 are numerous and varied. For example, as illustrated in FIGURES 19, 20 and 21, an abrasive coated band 192 may be fastened to, embedded in, or otherwise integrally formed with a supporting fixture 196 to provide a grinding, planing, or shaping tool 198. In the embodiment of the invention depicted in FIGURES 19 and 20 the band or ribbon 192 is wound helically and extended axially to provide a generally conical or a stepped pyramidal structure in which the band 192 is spiral in form as illustrated schematically in FIGURE 21. A shaft 202 comprises means for gripping the tool in use. In view of the present disclosure it will be obvious that the principles illustrated schematically in FIGURES 19 and 20 may be adapted to provide a generally cone-shaped cavity constituting a concave grinding surface. Such a grinding tool would, in end view, also appear as in FIGURE 21.

In FIGURES 22 and 23 the present invention is illustrated schematically as a plurality of radially spaced or internesting band elements, each endless, and firmly held against relative movement. Referring more particularly to the grinding tool 210 as illustrated in FIGURE 22, a plurality of bands 212, each extending generally coaxially with the tool 210 and the bands 212 being generally concentric, or coaxial, are imbedded or otherwise firmly retained in a supporting substrate 216. As clearly illustrated, the several endless bands are displaced axially so that their edges 218 define a generally convex grinding surface 220, it being also clearly indicated that the peripheral edge portions 224 carry abrasive particles 60, which in this example are on one side only of the bands 212, but which may be on both sides as shown in the tool of FIGURE 19. The grinding tool 210 may conveniently be provided with a suitable shaft 228 by means of which the tool may be manipulated in use.

FIGURE 23 is similar to FIGURE 22 but depicts a tool 230, on a shaft 232, in which concentrically disposed cutting elements or bands 234 are spaced axially to define a concave grinding surface 238. FIGURES 26 through 29 illustrate, schematically, end views of other tools embodying the inventive concept of the invention. In the tool 240 of FIGURE 26 the abrasive particles 60 are carried on a side surface 242 of a band 244, the band being shaped to form a triangle and bonded to a supporting substrate 246. A shaft 248 comprises means by which the tool is gripped in use. In the circular cutting tool 250 as illustrated in FIGURE 27 the band 254 carrying the abrasive particles 60 defines a groove cutting element. Another form of a grinding device is represented by the rectangular or polygon form tool 260 of FIGURE 28 and a tool 270 with an undulating or sinusoidal peripheral wall 272 is illustrated in FIGURE 29. Shafts 276 and 278 provide convenient means for turning or otherwise manipulating the tools.

It will be readily apparent that in fabricating tools such as illustrated in FIGURES 26 through 29, and other tools of the invention, auxiliary substrates may be omitted and the abrasive carrying band be made sufficiently rigid to meet the demands of use.

FIGURE 30 shows a tool 280 on a shaft 282 similar to the tools 210 and 230 of FIGURES 19, 20 and 21, but with the convoluted band 294 defining at its cutting edge a locus of abrasive elements establishing a flat rather than a contoured grinding surface. The abrasive particles are carried on a side wall surface of the band 294. It will be appreciated that a similar tool for forming a flat surface may be fabricated from a plurality of concentric, vertically-arrayed, radially-spaced bands in accordance with the concept of the tools of FIGURES 22 and 23.

It will be readily understood and appreciated that the band (or wire) or the several abrasive carrying bands may traverse any preferred path or define any preferred cross sectional contour. That is, viewed endwise the metallic elements of the tools of the invention may take the form of circles or ellipses or may, alternatively, appear as triangles, rectangles, regular or irregular polygons, or any other preferred shape. It is also readily apparent that in the practice of the present invention one may conveniently combine in a given machining or grinding tool separate or connected abrasive-carrying metallic elements of varied configurations and of different shapes. It will also be appreciated that the band or wire itself may be sinusoidal saw-tooth, undulating, etc. rather than of a more constant curvature or straight.

It is within the inventive concept of the present invention that abrasive carrying bands or wires need not be spaced regularly either radially or axially, and that in any preferred application the abrasive-carrying edge portions of the bands may, as the tool is viewed in vertical section, define any desired or required contour. Thus, the improved abrasive cutting tools of the invention may conveniently be utilized in shaping or forming a workpiece surface into any preferred contour.

While disclosures of preferred embodiments of the invention and preferred methods for fabricating the structural components of the invention have been provided, it will be apparent to those skilled in the art that numerous modifications, changes, and variations can be made without departing from the essential spirit of the underlying principles of the invention. It is, therefore, desired by the following claims to include in the scope of the invention all such variations and modifications by which substantially the results of this invention may be obtained through the use of substantially the same or equivalent means.

What is claimed is:

1. In a rotary abrasive cutting tool adapted for precisely controlled manipulation to advance against a surface of a workpiece for precision shaping and cutting thereof and comprising in combination:
   a metallic element, and
   a plurality of abrasive particles firmly bonded to and coating said metallic element;
   the improvement wherein said abrasive particles are bonded to and occupy a surface of said metallic element extending in a direction generally paralleling a rotational axis of said tool,
   said metallic element comprising:
   band means,
   said band means secured in a substantially rigid supporting substrate,
   said band means presenting a longitudinal edge to a surface of said workpiece to be operated on,
   said abrasive particles being bonded to a side surface of said band means adjacent said longitudinal edge and defining a working zone extending generally transversely of said surface of said workpiece into which surface said abrasive particles of said cutting tool penetrate as said tool is presented to and advances against said workpiece during operation thereon.

2. A tool as set forth in claim 1 wherein said band means is a convoluted ribbon-like band disposed to present an edge portion to a workpiece and wherein said abrasive particles are bonded to a side surface of said band adjacent said edge portion thereof.

3. A tool as set forth in claim 1 wherein said metallic band means comprises a series of relatively fixed concentrically disposed radially spaced bands oriented to extend generally in a direction paralleling a rotational axis of said tool, said abrasive particles being bonded on side surfaces of said bands adjacent workpiece-presented edge portions thereof.

4. A tool as set forth in claim 3 wherein said edge portions of said band define a convex surface as presented to said workpiece during operation thereon.

5. A tool as set forth in claim 3 wherein said edge portions of said band define a concave surface as presented to said workpiece.

6. A tool as set forth in claim 2 wherein said edge lies in a substantially flat plane.

7. A tool as set forth in claim 2 wherein said edge defines a convex surface as presented to a workpiece to be operated on.

8. A tool as set forth in claim 2 wherein said edge defines a concave surface as presented to a workpiece to be operated on.

9. A tool as set forth in claim 2 wherein said edge defines a generally conical surface.

10. A tool as set forth in claim 1 wherein said metallic element comprises a wire.

11. A tool as set forth in claim 1, wherein the said working zone formed by said abrasive particles bonded to said metallic element defines a conic section.

12. A tool as set forth in claim 1 wherein said metallic element comprises a plurality of interesting bands having substantially parallel principal wall surfaces projecting in a direction paralleling a rotational axis of said tool and extending generally transversely of said surface of said workpiece to be operated on by said tool, said abrasive particles being bonded to said wall surfaces in a region proximate workpiece-abutting edges of said bands.

13. A tool as set forth in claim 1 wherein said edge traverses a locus defining a conic section.

14. A tool as set forth in claim 1 wherein said metallic element traverses a sinusoidal path.

References Cited

UNITED STATES PATENTS

| | | | |
|---|---|---|---|
| 678,301 | 7/1901 | Lucas | 51—205 |
| 693,306 | 2/1902 | Peckover | 125—18 |
| 1,457,452 | 6/1923 | Morris | 51—205 |
| 1,864,616 | 6/1932 | Rayner | 51—205 X |
| 2,050,054 | 8/1936 | Hillix | 51—205 |
| 2,442,153 | 5/1948 | Van Der Pyl | 125—21 |
| 2,562,587 | 7/1951 | Swearingen | 51—309 |
| 2,633,681 | 4/1953 | Sam | 125—18 X |
| 2,796,705 | 6/1957 | Miller | 51—206 |
| 2,811,960 | 11/1957 | Fessel | 125—15 |
| 3,127,715 | 4/1964 | Christensen | 51—206 |
| 3,150,470 | 9/1964 | Barron | 125—21 X |
| 3,343,308 | 9/1967 | Fessel | 51—395 |
| 3,353,526 | 11/1967 | Daem | 125—15 |

ROBERT C. RIORDON, *Primary Examiner.*

D. G. KELLY, *Assistant Examiner.*